(12) United States Patent
Shiina et al.

(10) Patent No.: US 11,700,560 B2
(45) Date of Patent: Jul. 11, 2023

(54) WIRELESS COMMUNICATION SYSTEM, WIRELESS COMMUNICATION METHOD AND TERMINAL DEVICE

(71) Applicant: NIPPON TELEGRAPH AND TELEPHONE CORPORATION, Tokyo (JP)

(72) Inventors: Ryota Shiina, Musashino (JP); Kazutaka Hara, Musashino (JP); Tomohiro Taniguchi, Musashino (JP); Tomoki Murakami, Musashino (JP); Toshiro Nakahira, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 10 days.

(21) Appl. No.: 17/619,663

(22) PCT Filed: Jun. 20, 2019

(86) PCT No.: PCT/JP2019/024584
§ 371 (c)(1),
(2) Date: Dec. 16, 2021

(87) PCT Pub. No.: WO2020/255354
PCT Pub. Date: Dec. 24, 2020

(65) Prior Publication Data
US 2022/0361070 A1    Nov. 10, 2022

(51) Int. Cl.
*H04B 10/00* (2013.01)
*H04W 36/08* (2009.01)
(Continued)

(52) U.S. Cl.
CPC ........ *H04W 36/08* (2013.01); *H04B 10/0795* (2013.01); *H04B 10/112* (2013.01)

(58) Field of Classification Search
CPC ... H04B 10/11; H04B 10/112; H04B 10/1129; H04B 10/114; H04B 10/1149; H04B 10/116
See application file for complete search history.

(56) References Cited

U.S. PATENT DOCUMENTS

2015/0319639 A1*  11/2015  Poola ............... H04W 28/0226
                                                  398/115
2020/0382958 A1*  12/2020  Wang ................... H04B 10/116

OTHER PUBLICATIONS

Yusuf Said Eroglu et al., Multi-element VLC networks: LED assignment, power control, and optimum combining, IEEE Journal on Selected Areas in Communications, vol. 36, No. 1, 2018, pp. 121-135.

(Continued)

*Primary Examiner* — Daniel G Dobson
(74) *Attorney, Agent, or Firm* — Harness, Dickey & Pierce, P.L.C.

(57) ABSTRACT

The present disclosure aims to enable communication to be performed with stable quality even when a user uses a terminal while moving. In the wireless communication system according to the present disclose, a switching control unit 15 sets switching illuminance $p_{th}$ for maintaining illuminance of an optical signal received by a terminal 91 at requested illuminance corresponding to throughput or higher during the time until connection switching between the communication with an optical wireless access point 92 and the communication with an RF wireless access point 93 is completed, and when the received illuminance p becomes lower than the switching illuminance $p_{th}$ during connection with the optical wireless access point 92, the switching control unit 15 performs connection switching from the optical wireless communication to the RF wireless communication.

8 Claims, 6 Drawing Sheets

(51) Int. Cl.
H04B 10/079 (2013.01)
H04B 10/112 (2013.01)
H04J 14/00 (2006.01)

(56) References Cited

OTHER PUBLICATIONS

Wei Xu et al., Indoor positioning for multiphotodiode device using visible-light communications, IEEE Photonics Journal, vol. 8, No. 1, 2016.
Jiaan Wang et al., Study of LED layout in indoor visible light communication and performance analysis, Applied Optics and Photonics China (AOPC2017), Jun. 4, 2017.
Moussa Ayyash et al., Coexistence of WiFi and LiFi toward 5G: Concepts, opportunities, and challenges, IEEE Communications Magazine, vol. 54, No. 2, 2016, pp. 64-71.
Sihua Shao et al., Design and analysis of a visible-light-communication enhanced WiFi system, IEEE/OSA J. Opt. Commun. Netw, vol. 7, No. 10, 2015, pp. 960-973.

* cited by examiner

# WIRELESS COMMUNICATION SYSTEM, WIRELESS COMMUNICATION METHOD AND TERMINAL DEVICE

CROSS-REFERENCE TO RELATED APPLICATIONS

This application is a 371 U.S. National Phase of International Application No. PCT/JP2019/024584 filed on Jun. 20, 2019. The entire disclosures of the above applications are incorporated herein by reference.

TECHNICAL FIELD

The present disclosure relates to a wireless communication system and a wireless communication method for realizing stable communication even for moving users by determining the channel throughput by illuminance, in the optical/RF hybrid wireless communication environment where respective channels of optical wireless transmission and radio frequency (RF) wireless transmission are selectively used.

BACKGROUND ART

Recently, the utilization and the traffic of wireless devices are increasing explosively. Along with such an increase in wireless devices, use of the existing wireless frequency bands is tight, and the influence thereof appears as an interference between terminals. This causes various problems such as an increase of delays and a decrease of throughput. In order to mitigate such problems in wireless links, a new approach is required. Optical wireless communication having rich frequency resources is considered as a candidate thereof. In recent years, high-throughput communication of 1 Gbps or more is likely to be available with use of an inexpensive light source such as LED (Non-patent Literature 1). In general, however, optical wireless transmission has characteristics that a communicable area is likely to be limited due to high straight advance property of light, and that it is vulnerable to light interruption by an object (Non-Patent Literature 2). Therefore, a method of expanding a cover area by arranging a plurality of optical wireless light sources in a mesh has been provided (Non-Patent Literature 3), and research and development has been made for, with a plurality of light receiving elements provided to a terminal, achieving stable throughput with respect to the position and angle of a terminal using reflected light from walls or the like (Non-Patent Literature 2). In the former case, physical constraints in the facilities are large, and there is a possibility that relocation of light sources (illumination) may be required for securing signal quality in the communication. In the latter case, since a plurality of light receiving elements are provided to a terminal, complexity and scalability of the terminal increase, causing a problem in the viewpoint of terminal costs.

Meanwhile, a coexisting system in which optical wireless transmission and the existing RF are combined has been proposed (Non-Patent Literatures 4 and 5). In the optical/RF coexisting wireless system, optical wireless transmission and RF wireless transmission are individually used as data communication channels to establish a stable communication environment.

In order to solve tightness of the wireless frequency band and instability in the communication quality that are problems in the existing RF wireless system, an optical/RF coexisting system has been proposed. In the optical/RF coexisting wireless system, optical wireless transmission and RF wireless transmission are individually used as data communication channels to establish a stable communication environment. In the conventional study of the optical/RF coexisting wireless system, stable communication is realized on the assumption that communication is performed by a terminal in a static state. However, along with an increase in the wireless terminal usage, a situation where a user uses a terminal while moving is highly likely in the living environment and the office environment. For example, in the case where an optimum channel in which high throughput characteristics are obtained at the time of initial connection is optical wireless transmission, the terminal uses the optical wireless channel. Although the optical wireless transmission achieves high throughput, it has a feature that a cell radius in which high throughput can be realized is smaller than that of RF wireless transmission because of the high straight advance property. Therefore, when a user moves from an area under an access point (hereinafter referred to as AP) of the optical wireless transmission, the throughput in the optical wireless transmission deteriorates drastically, causing instability in communication. Therefore, in order to solve instability in communication, seamless connection is required between the optical wireless transmission and the RF wireless transmission.

When a user moves, the degree of deterioration in the throughput differs depending on how the user moves. Therefore, there is a demand for an optical/RF coexisting wireless system capable of realizing channel switching that can meet the required throughput for various expected users.

CITATION LIST

Non-Patent Literature

Non-Patent Literature 1: Y. S. Eroglu et al., "Multi-element VLC networks: LED assignment, power control, and optimum combining," IEEE J. Sel. Area. Commun., vol. 36, no. 1, pp. 121-135, January 2018.

Non-Patent Literature 2: W. Xu, J. Wang, H. Shen, H. Zhang, and X. You, "Indoor positioning for multiphotodiode device using visible-light communications," IEEE Photon. J., vol. 8, no. 1, February 2016.

Non-Patent Literature 3: Wang, Jiaan, et al. "Study of LED layout in indoor visible light communication and performance analysis." Applied Optics and Photonics China (AOPC2017), Beijing, China, 2017.

Non-Patent Literature 4: M. Ayyash et al., "Coexistence of WiFi and LiFi toward 5G: Concepts, opportunities, and challenges," IEEE Commun. Mag., vol. 54, no. 2, pp. 64-71, February 2016

Non-Patent Literature 5: S Shao et al., "Design and analysis of a visible-light-communication enhanced WiFi system," IEEE/OSA J. Opt. Commun. Netw., vol. 7, no. 10, pp. 960-973, October, 2015.

SUMMARY OF THE INVENTION

Technical Problem

An object of the present disclosure is to enable communication to be performed with stable quality even when a user uses a terminal while moving.

Means for Solving the Problem

The present disclosure is made to solve the problems described above. The present disclosure discloses a hybrid wireless communication system in which an RF wireless system using the frequency band in the radio wave region and an optical wireless system using the frequency band in the optical wave region are united, so that tightness in the frequency band and instable communication quality in wireless transmission sections are solved. In this system, switching between the optical wireless channel and the RF wireless channel are performed, in consideration of movement of the users.

A wireless communication system according to the present disclosure includes an optical wireless access point;

a radio frequency (RF) wireless access point; and a terminal device having a switching control unit that performs a communication process with the optical wireless access point and the RF wireless access point.

Assuming that illuminance of an optical signal for performing communication at a throughput set for the communication with the optical wireless access point is requested illuminance, the switching control unit sets switching illuminance for maintaining illuminance of an optical signal received by the terminal device at the requested illuminance or higher during the time until connection switching between the communication with the optical wireless access point and the communication with the RF wireless access point is completed, and the switching control unit measures received illuminance of an optical signal transmitted from the optical wireless access point during connection with the optical wireless access point, and compares the measured received illuminance with the switching illuminance.

When the received illuminance becomes lower than the switching illuminance during the connection with the optical wireless access point, the switching control unit performs connection switching from the communication with the optical wireless access point to the communication with the RF wireless access point.

A terminal device according to the present disclosure includes an optical wireless communication unit that performs communication with an optical wireless access point, and an RF wireless communication unit that performs communication with a radio frequency (RF) wireless access point; and a switching control unit.

Assuming that illuminance of an optical signal for performing communication at a throughput set for the communication with the optical wireless access point is requested illuminance, the switching control unit sets switching illuminance for maintaining illuminance of an optical signal received by the terminal device at the requested illuminance or higher during the time until connection switching between the communication with the optical wireless access point and the communication with the RF wireless access point is completed, and the switching control unit measures the received illuminance of an optical signal transmitted from the optical wireless access point during connection with the optical wireless access point, and compares the measured received illuminance with the switching illuminance.

When the received illuminance becomes lower than the switching illuminance during the connection with the optical wireless access point, the switching control unit performs connection switching from the communication with the optical wireless access point to the communication with the RF wireless access point.

A wireless communication method comprising:

by a switching control unit provided to a terminal device, assuming that illuminance of an optical signal for performing communication at a throughput set for the communication with the optical wireless access point is requested illuminance, setting switching illuminance for maintaining illuminance of an optical signal received by the terminal device at the requested illuminance or higher during the time until connection switching between the communication with the optical wireless access point and the communication with the radio frequency (RF) wireless access point is completed;

measuring the received illuminance of an optical signal transmitted from the optical wireless access point during connection with the optical wireless access point, and comparing the measured received illuminance with the switching illuminance; and when the received illuminance becomes lower than the switching illuminance during the connection with the optical wireless access point, performing connection switching from the communication with the optical wireless access point to the communication with the RF wireless access point.

Effects of the Invention

With the present disclosure, it is possible to realize stable communication quality even for a moving user in a wireless communication system.

DESCRIPTION OF EMBODIMENTS

Figure 1:
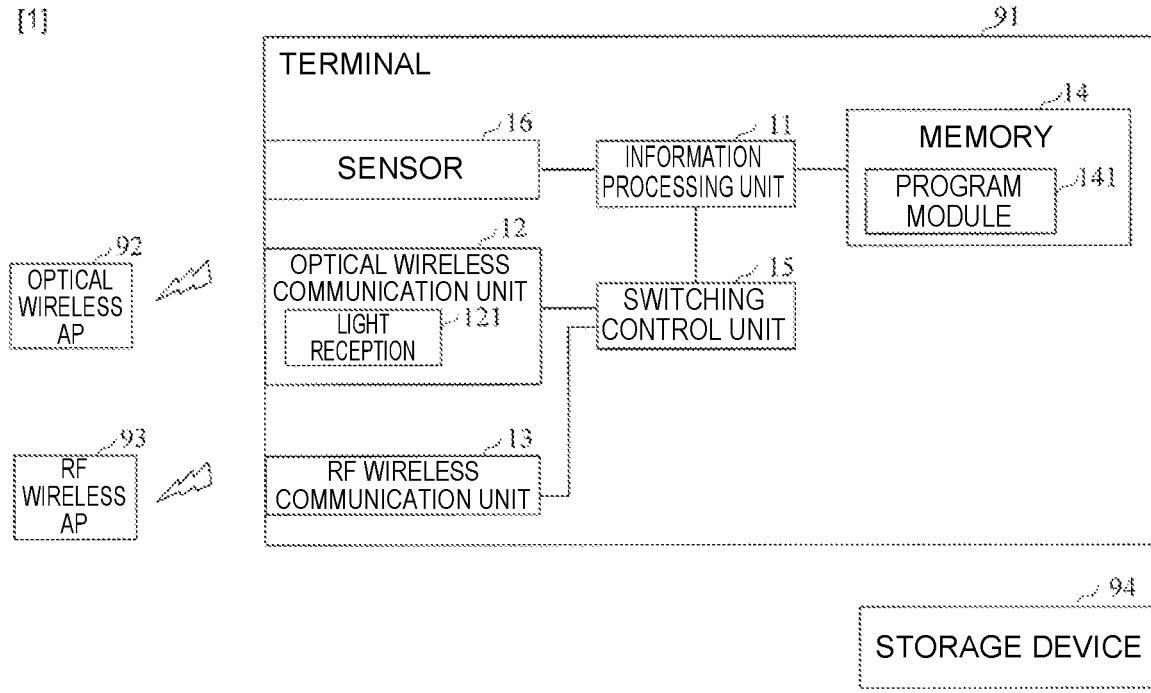
FIG. 1 is an exemplary system configuration according to the present disclosure.

Hereinafter, embodiments of the present disclosure will be described in detail with reference to the drawings. Note that the present disclosure is not limited to the embodiments described below. The embodiments are mere examples, and the present disclosure can be carried out in modes applied with various changes and modifications based on the knowledge of those skilled in the art. Note that the constituent elements denoted by the same reference numerals in the description and the drawings show the same elements.

One feature of the present disclosure is to adopt the configuration described below.

An optical/RF hybrid wireless communication system includes an optical wireless access point, an RF wireless access point, and a terminal that performs communication by selecting either the optical wireless channel or the RF wireless channel.

The terminal device
regularly measures the illuminance of an optical signal transmitted from the optical wireless access point, and
when the illuminance measured during connection on the optical wireless channel becomes lower than the switching illuminance, performs connection switching from the optical wireless channel to the RF wireless channel, while when the illuminance measured during connection on the RF wireless channel becomes equal to or higher than reference illuminance that is higher than the switching illuminance, performs connection switching from the RF wireless channel to the optical wireless channel.

Assuming that illuminance of an optical signal communicable at a requested throughput on the optical wireless channel is requested illuminance, the switching illuminance is set to have a value larger than the requested illuminance such that the illuminance of an optical signal received by the terminal device becomes equal to or higher than the requested illuminance during the time until connection switching from the optical wireless channel to the RF wireless channel is completed.

First Embodiment

FIG. 1 illustrates a system configuration according to the present embodiment. A wireless communication system according to the present embodiment is an optical/RF hybrid system using RF wireless transmission of a radio wave region and a frequency band of an optical wave region. The system includes a terminal 91 used by a user, an optical wireless AP 92, and an RF wireless AP 93. The terminal 91 includes an information processing unit 11, an optical wireless communication unit 12, an RF wireless communication unit 13, a memory 14, a switching control unit 15, and a sensor 16. The optical wireless communication unit 12 and the RF wireless communication unit 13 are connected to the switching control unit 15, and the memory, 14, the control unit 15, and the sensor 16 are connected to the information processing unit 11.

The switching control unit 15 performs channel switching between the optical wireless communication unit 12 and the RF wireless communication unit 13. The optical wireless communication unit 12 is an arbitrary means communicable with the optical wireless AP 92. For example, the optical wireless communication unit 12 includes a light source (note shown) that generates an optical signal, and a light reception unit 121 that receives an optical signal transmitted from the optical wireless AP 92. The RF wireless communication unit 13 is an arbitrary means communicable with the RF wireless AP 93. For example, the RF wireless communication unit 13 includes a signal generation unit (not shown) that generates an RF signal, and an antenna (not shown) that receives an RF signal.

The information processing unit 11 is an electronic device configured of a logical circuit that responds to an instruction and executes an instruction. The memory 14 is an arbitrary storage medium readable by the information processing unit 11.

The memory 14 stores a program module 141. The program module 141 includes an instruction for controlling the information processing unit 11 to execute processes described in the present specification. The instruction includes an instruction to execute an application described below. While it is described that the program module 141 has been stored in the memory 14, the program module 141 may be configured to be positioned on the storage device 94 so as to be stored in the memory 14 later. The storage device 94 is a tangible computer-readable storage medium storing the program module 141. The storage device 94 may be a random access memory, or another type of electronic storage device located at a remote storage system and to be connected to the terminal 91 via a network.

Figure 2:
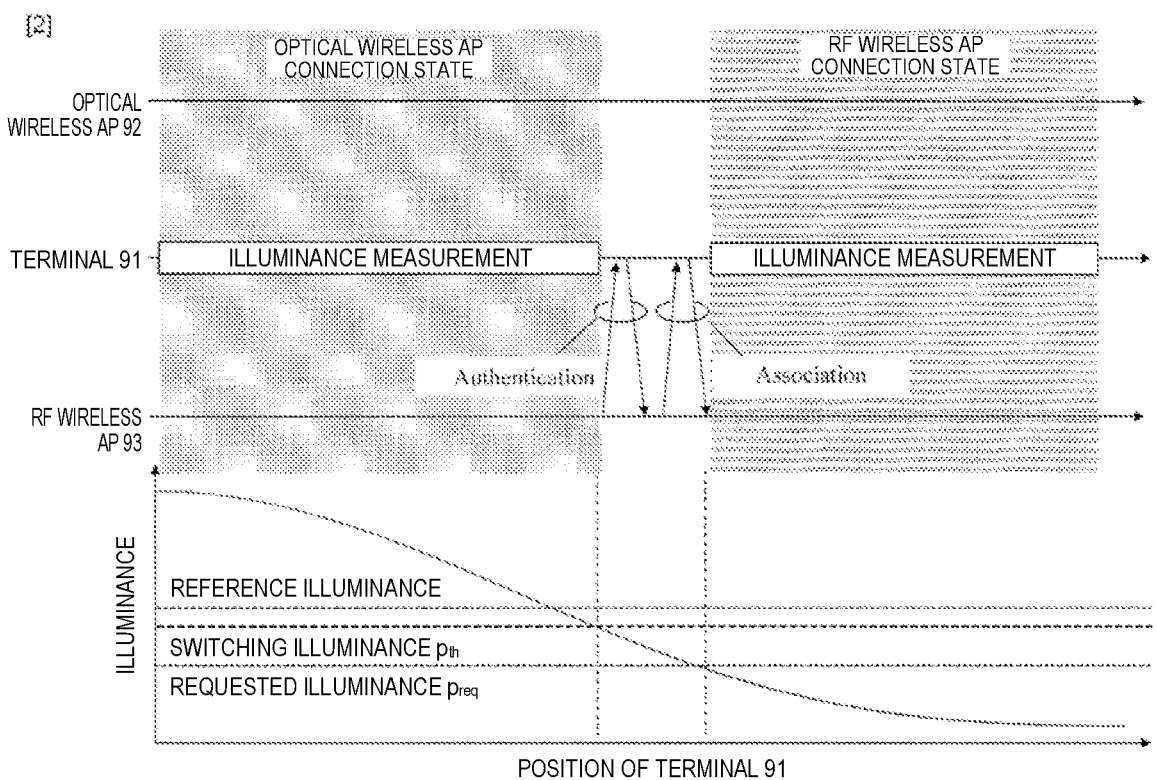
FIG. 2 illustrates an example of a switching method from optical wireless transmission to RF wireless transmission according to the present disclosure.
Figure 3:
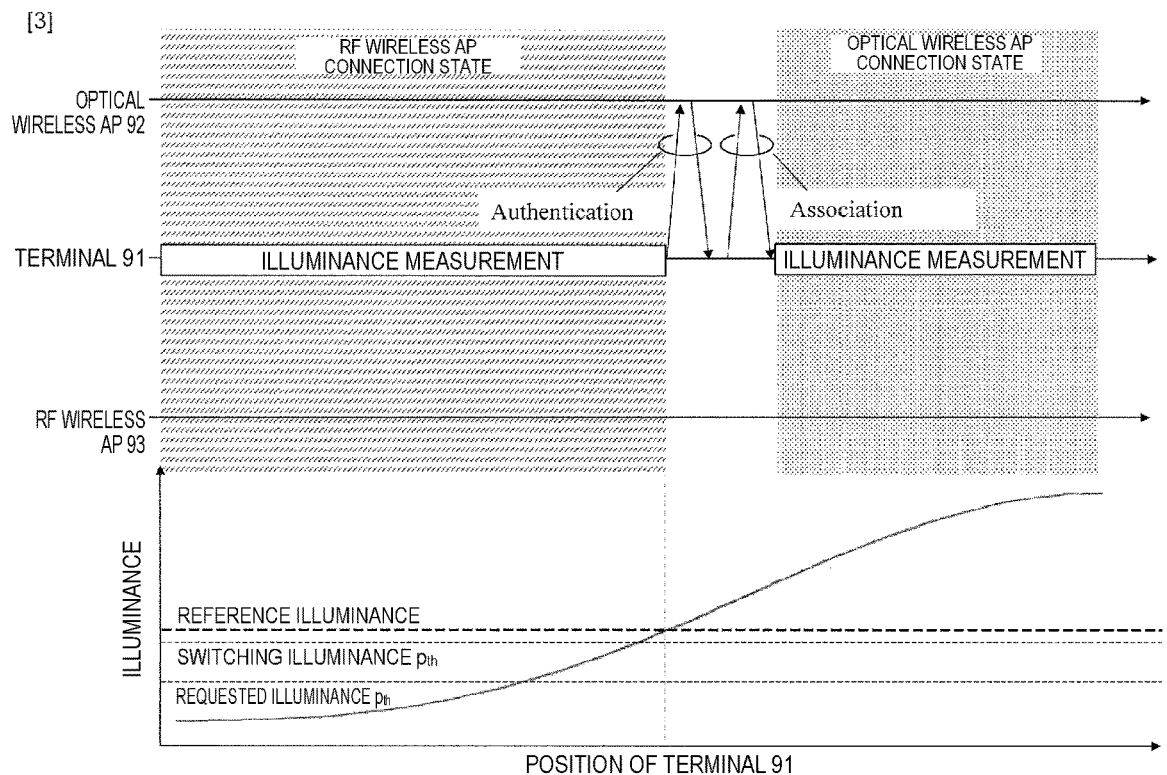
FIG. 3 illustrates an example of a switching method from RF wireless transmission to optical wireless transmission according to the present disclosure.

FIGS. 2 and 3 illustrate channel switching in the system of the present embodiment. In this switching method, the switching control unit 15 measures the illuminance of an optical signal received by the light reception unit 121, and monitors channel throughput of the optical wireless channel by the measured illuminance of the optical signal (hereinafter referred to as received illuminance). The switching control unit 15 performs switching between the optical wireless channel and the RF wireless channel according to the channel throughput of the optical wireless channel.

For example, FIG. 2 illustrates the case where switching is performed from a state of being connected to the optical wireless AP 92 to the RF wireless AP 93. As illustrated in FIG. 2, the switching control unit 15 regularly measures the received illuminance. When the measured illuminance becomes equal to or lower than the switching illuminance, the RF wireless communication unit 13 performs a connection process to the RF wireless AP 93 such as Authentication and Association.

Here, design of the switching illuminance is performed as described below. In order to satisfy requested illuminance corresponding to the throughput having been requested by the user, it is necessary to set the switching illuminance to be higher than the requested illuminance. However, if the switching illuminance is set to be too high, since switching must be performed in a state where high throughput can be achieved, it is inefficient. Moreover, assuming the case where the user moves, since the extent of attenuation of the throughput changes according to the moving velocity of the user, it is necessary to set a margin in consideration of the moving velocity of the user when designing the switching illuminance. A design expression will be shown as Expression (1).

[Math. 1]

$$p_{th} = \Delta t \left| \frac{dp}{dt} \right|_{maximized} + p_{req} \qquad (1)$$

Here, $p_{th}$ represents switching illuminance, and $p_{req}$ represents requested illuminance. Further, $\Delta t$ represents the channel switching time in the system including Authentication and Association, and p represents received illuminance. In Expression (1), a value obtained by multiplying the channel switching time $\Delta t$ by a maximum value of an absolute value of the time change rate of the received illuminance p is set as a margin.

Figure 4:
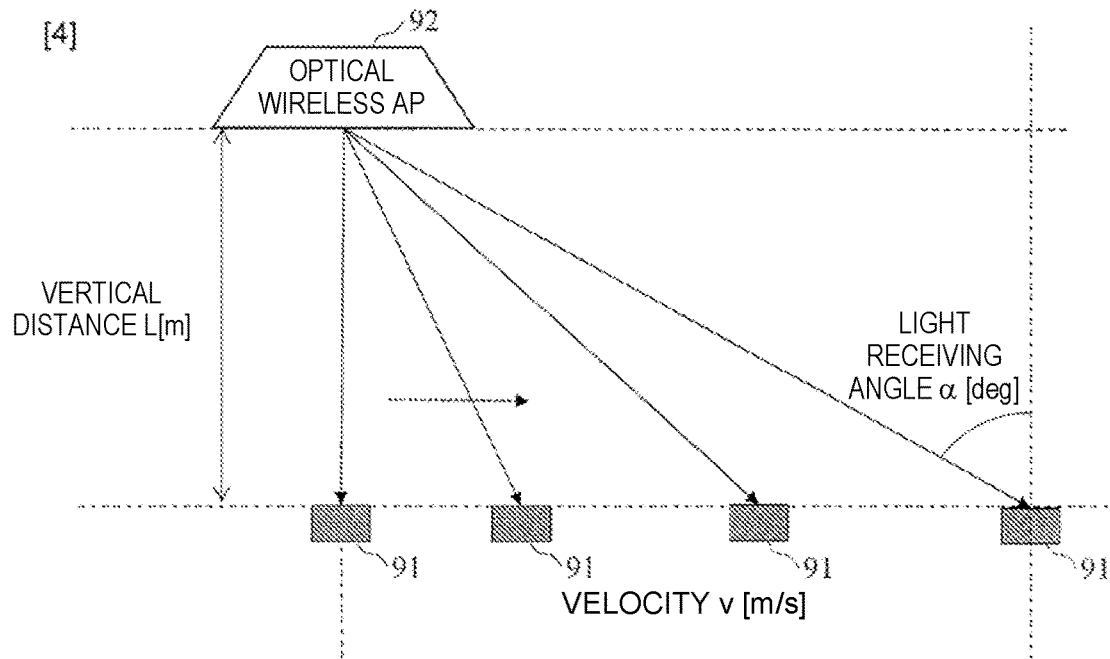
FIG. 4 illustrates an example of a moving model of a user.

Here, considering a model as illustrated in FIG. 4, the received illuminance p in the terminal 91 is generally expressed with a coefficient n by an expression provided below.

[Math. 2]

$$p = \cos^n \alpha \qquad (2)$$

Here, α represents a light receiving angle, and a coefficient n represents a predetermined coefficient. It is preferable that the coefficient n is determined by the directivity of the light source that generates an optical signal in the optical wireless AP 92.

As illustrated in FIG. 4, in the case where the terminal 91 moves from a position of a vertical distance L[m] at a moving velocity v [m/s], the time change rate of the received illuminance p is expressed by Expression (3).

[Math. 3]

$$\frac{dp}{dt} = n\cos^{n-1}\alpha(-\sin\alpha)\frac{v/L}{1+\tan^2\alpha} = -\frac{nv}{L}\cos^{n+1}\alpha\sin\alpha \quad (3)$$

Where $\alpha = \tan^{-1} vt/L$, $0 \leq \alpha \leq \pi/2$.

Therefore, from Expressions (1) and (3), the switching illuminance $p_{th}$ is expressed by Expression (4).

[Math. 4]

$$p_{th} = \Delta t \left| -\frac{nv}{L}\cos^{n+1}\alpha\sin\alpha \right|_{maximized} + p_{req} \quad (4)$$

With Expression (4), it is possible to design optimum switching illuminance $p_{th}$ while taking into account the moving velocity v of the user.

FIG. 3 illustrates the case where switching is performed from a state of being connected to the RF wireless AP 93 to the optical wireless AP 92. The switching control unit 15 regularly measures the received illuminance of optical signals received by the light reception unit 121 even during the time when connection is established with the RF wireless AP 93. When the measured received illuminance becomes equal to or higher than the reference illuminance, the optical wireless communication unit 12 performs a connection process to the optical wireless AP 92 such as Authentication and Association. The reference illuminance is assumed to be higher than the switching illuminance $p_{th}$ described above, and it can be changed flexibly according to the throughput requested by the user.

Figure 5:
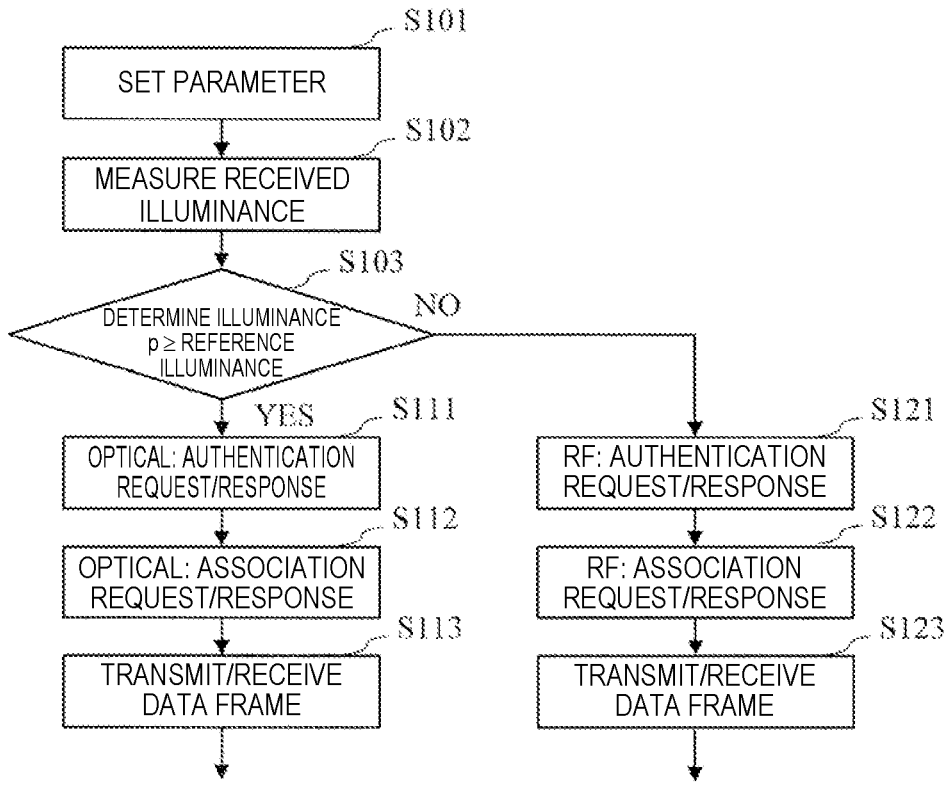
FIG. 5 illustrates an example of an initial connection flow according to a first embodiment.

Hereinafter, in FIGS. 5 and 6, a flow from initial connection to channel switching in the system of the present embodiment is illustrated in flowcharts. FIG. 5 illustrates an initial connection flow.

In the initial connection, first, the switching control unit 15 acquires connection information to the optical wireless AP 92 from the memory 14, and based on it, sets a parameter (S101). The parameter is an arbitrary parameter used for derivation of requested illuminance, switching illuminance, and reference illuminance.

Acquisition of parameters is performed as described below, for example.

First, the switching control unit 15 acquires the throughput set to the terminal 91 and, with use of it, derives the requested illuminance $p_{req}$. Derivation is performed by, for example, referring to a table in which the requested illuminance $p_{req}$ corresponding to the throughput is defined.

Then, the switching control unit 15 derives the switching illuminance $p_{th}$ with use of the derived requested illuminance $p_{req}$. Derivation is performed by, for example, applying the channel switching time $\Delta t$, the coefficient n, the moving velocity of the terminal 91, and the vertical distance L, to Expression (4). As a method of deriving a parameter of Expression (4), any method may be used. Then, the switching control unit 15 derives the reference illuminance with use of the switching illuminance $p_{th}$. Derivation is performed by, for example, referring to a table in which reference illuminance corresponding to the requested illuminance $p_{req}$ and the throughput is defined.

Here, as the channel switching time $\Delta t$ used in Expression (4), a predetermined time can be used. It may be set for each optical wireless AP 92 or each RF wireless AP 93. For example, the optical wireless communication unit 12 may acquire the channel switching time $\Delta t$ from the optical wireless AP 92 as information of the optical wireless AP 92 during communication with the optical wireless AP 92, or the switching control unit 15 may derive the channel switching time $\Delta t$ by using the information acquired by the optical wireless communication unit 12 from the optical wireless AP 92. Similarly, for the RF wireless AP 93, the RF wireless communication unit 13 may acquire the channel switching time $\Delta t$ from the RF wireless AP 93 as information of the RF wireless AP 93 during communication with the RF wireless AP 93, or the switching control unit 15 may derive the channel switching time $\Delta t$ by using the information acquired by the RF wireless communication unit 13 from the RF wireless AP 93.

The coefficient n used in Expression (4) is obtained using a table in which the coefficient n corresponding to the directivity of the light source is defined. For example, the optical wireless communication unit 12 acquires the directivity of the light source provided to the optical wireless AP 92 as information of the optical wireless AP 92, and the switching control unit 15 refers to the table to acquire the coefficient n corresponding to the acquired directivity of the light source. Here, it is preferable that the coefficient n corresponding to the directivity of the light source and the position of the user is defined in the table. It is preferable that the position of the user is a three-dimensional position including the height direction.

For the moving velocity of the terminal 91, various types of sensors provided to the terminal 91 may be used. For example, when the sensor 16 is a sensor that detects the position of the terminal 91, the information processing unit 11 derives the moving velocity of the terminal 91 using the position detected by the sensor 16. When the sensor 16 is a sensor that detects acceleration, the information processing unit 11 derives the moving velocity of the terminal 91 using the acceleration of the terminal 91.

The vertical distance L is calculated using the position of the terminal 91 and the position of the optical wireless AP 92. For the position of the terminal 91, the sensor 16 that detects the position of the terminal 91 can be used. The position of the optical wireless AP 92 can be acquired from the optical wireless AP 92 at the time of connection with the optical wireless AP 92. The vertical distance L may be a round-trip delay time with the optical wireless AP 92 measured by the optical wireless communication unit 12.

Regarding the information of the optical wireless AP 92, the terminal 91 uses a dedicated application or the like to be executed using the program module 141 to acquire connection information to the optical wireless AP 92 grasped in advance, and stores it in the memory 14. Here, connection information to the optical wireless AP 92 is, for example, illuminance information indicating directivity or the like of the light source of the optical wireless AP 92, moving velocity information of the user at the installation location of the optical wireless AP 92, installation information of the optical wireless AP 92, and the like. As described above, the switching control unit 15 is able to derive a parameter using any available information of the optical wireless communication unit 12, the RF wireless communication unit 13, and the information processing unit 11 that can be acquired.

Then, the switching control unit 15 performs measurement of the received illuminance (S102). The switching control unit 15 makes connection to either the optical wireless AP 92 or the RF wireless AP 93, on the basis of the measured received illuminance p (S103). For example, the switching control unit 15 allows the optical wireless communication unit 12 to connect to the optical wireless AP 92 when the received illuminance is equal to or higher than the reference illuminance, while allows the RF wireless communication unit 13 to connect to the RF wireless AP 93 when the received illuminance is equal to or lower than the reference illuminance. In the case where p≥reference illuminance, the optical wireless communication unit 12 performs Authentication (S111) and Association (S112) with the optical wireless AP 92, and then performs transmission and reception of a data frame (S113). On the other hand, in the case where p<reference illuminance, the RF wireless communication unit 13 performs Authentication (S121) and Association (S122) with the RF wireless AP 93, and then performs transmission and reception of a data frame (S123).

Figure 6:
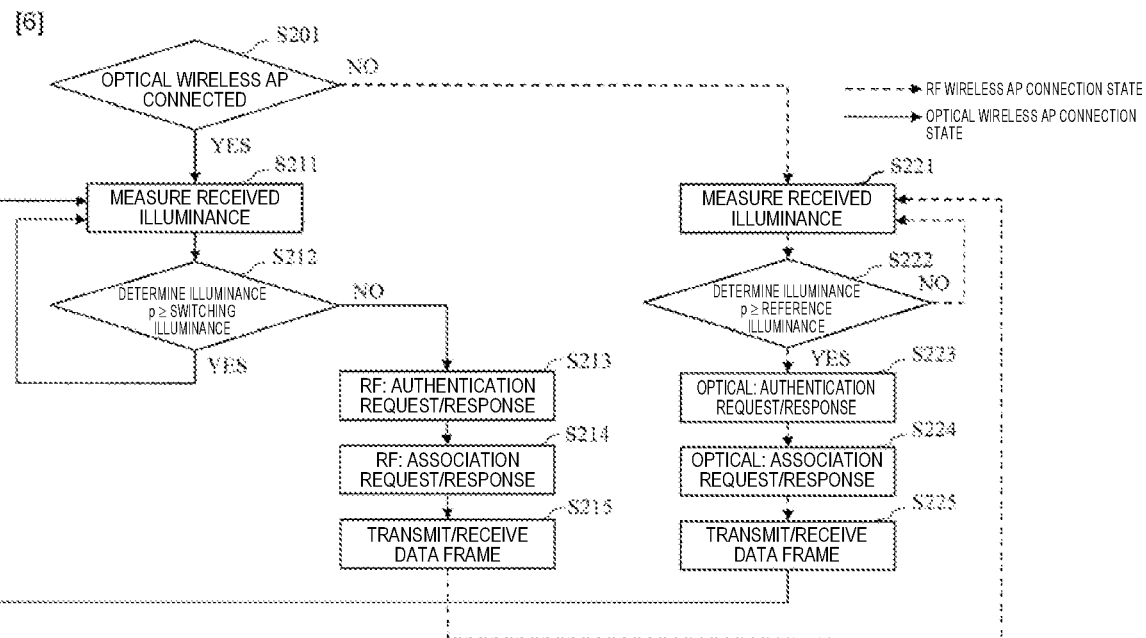
FIG. 6 illustrates an example of a channel switching flow according to first and second embodiments.

FIG. 6 illustrates a channel switching flow. First, the switching control unit 15 determines with which of the optical wireless AP 92 and the RF wireless AP 93 connection is established (S201). When connection is established with the optical wireless AP 92, the switching control unit 15 proceeds to step S211, while when connection is not established with the optical wireless AP 92, the switching control unit 15 proceeds to step S221.

In the case where connection is established with the optical wireless AP 92, the switching control unit 15 measures the received illuminance in the light reception unit 121 (S211), and determines whether or not the monitored received illuminance p is equal to or higher than the switching illuminance $p_{th}$ (S212). When the monitored received illuminance p is equal to or higher than the switching illuminance $p_{th}$, the switching control unit 15 measures the received illuminance.

On the other hand, when the monitored received illuminance p is lower than the switching illuminance $p_{th}$ (No at S212), the switching control unit 15 immediately performs channel switching to the RF wireless transmission. In that case, the RF wireless communication unit 13 performs request/response regarding Authentication (S213) and request/response regarding Association (S214) of the RF wireless transmission, and then performs transmission of a data frame (S215). After connection to the RF wireless transmission has been completed, the processing proceeds to the flow of steps S221 to S225. In this flow, processes similar to those of step S102 to S113 such as measurement of received illuminance (S221) and illuminance determination (S222) are performed.

Next, description will be given on a channel switching flow in the case where, as a result of determining connection with the optical wireless AP and the RF wireless AP (S201), connection is not established with the optical wireless AP 92 and it is confirmed that connection is established with the RF wireless transmission. Even in the case where connection is established with the RF wireless transmission, the switching control unit 15 regularly performs measurement of the received illuminance (S221). When the measured received illuminance is lower than the reference illuminance (S222: NO), the switching control unit 15 performs measurement of the received illuminance while maintaining the connection with the RF wireless transmission (S221). On the other hand, when the measured illuminance is equal to or higher than the reference illuminance (S222: YES), in order to connect with the optical wireless channel, the optical wireless communication unit 12 performs request/response regarding Authentication (S223) and request/response regarding Association (S224) with the optical wireless AP 92, and then performs transmission of a data frame (S225). Once connection with the optical wireless AP 92 is established, the processing proceeds to the flow of received illuminance measurement (211), and the switching control unit 15 performs measurement of received illuminance and illuminance determination.

Channel switching is performed according to the channel switching flow as described above.

Second Embodiment

The present embodiment differs from the first embodiment in the initial connection flow. Hereinafter, description will be given only on the part different from the first embodiment.

Figure 7:
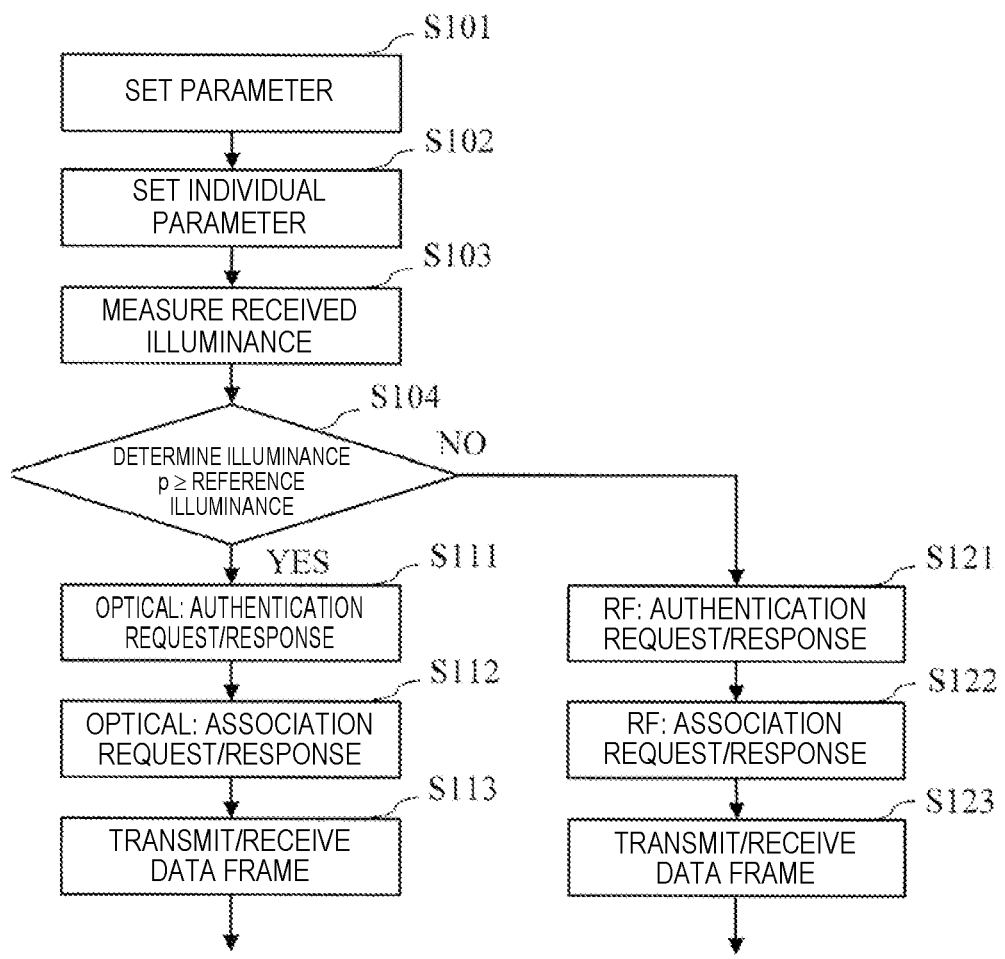
FIG. 7 illustrates an example of an initial connection flow according to the second embodiment.

FIG. 7 illustrates an initial connection flow. First, the terminal 91 used by a user uses a dedicated application or the like to acquire connection information to the optical wireless AP 92 having been grasped in advance. Here, connection information to the optical wireless AP 92 is, for example, illuminance information indicating directivity or the like of the light source of the optical wireless AP 92, installation information of the optical wireless AP 92, and the like. The switching control unit 15 acquires such connection information to the optical wireless AP 92, and based on it, automatically sets a parameter, and stores it in the memory 14 (S101).

Then, the switching control unit 15 extracts, from the memory 14, velocity information, acceleration information, and the like of the user holding the terminal 91, and uses them comprehensively, to thereby set a velocity parameter of the user (S102). Here, velocity information and acceleration information include at least one of average velocity, maximum walking velocity, minimum walking velocity, average acceleration, maximum acceleration, and minimum acceleration. For example, the switching control unit 15 calculates a maximum value of the absolute value of the maximum walking velocity of the target user by using the velocity information and the acceleration information previously recorded in the memory 14, and the maximum value is substituted as a v value in Expression (4). Thereby, in the present embodiment, more accurate switching illuminance $p_{th}$ can be set. These parameters may be set automatically by the information processing unit 11 via a dedicated application or the like.

Then, the switching control unit 15 performs measurement of the received illuminance (S103). Then, the switching control unit 15 establishes connection with either the optical wireless AP 92 or the RF wireless AP 93, on the basis of the measured received illuminance p (S104). For example, the switching control unit 15 allows the optical wireless communication unit 12 to connect to the optical wireless AP 92 when the received illuminance is equal to or higher than the reference illuminance, while allows the RF wireless communication unit 13 to connect to the RF wireless AP 93 when the received illuminance is lower than the reference illuminance. In the case where p≥reference illuminance, the optical wireless communication unit 12 performs Authentication (S111) and Association (S112) with the optical wireless AP 92, and then performs transmission and reception of a data frame (S113). On the other hand, in the case where p<reference illuminance, the RF wireless communication unit 13 performs Authentication (S121) and Association (S122) with the RF wireless AP 93, and then performs transmission and reception of a data frame (S123). Thereafter, channel switching is performed according to the channel switching flow of FIG. 6, as in the case of the first embodiment.

Third Embodiment

The present embodiment differs from the first embodiment in that Authentication process is executed in advance, whereby the switching time is reduced. In the present embodiment, Authentication process, that is IEEE 802.11 authenticated standard, is executed in advanced. Thereby, Authentication process in the connection process to the RF wireless AP 93 and the connection process to the optical wireless AP 92 illustrated in FIGS. 2 and 3 can be omitted, so that the switching time can be reduced. Thereby, in the present embodiment, deterioration of the throughput is decreased, and more accurate switching illuminance $p_{th}$ can be set.

Hereinafter, description will be given only on the part different from the first embodiment. Note that in the present embodiment, Δt in Expression (1) represents a channel switching time in the system such as Association.

Figure 8:
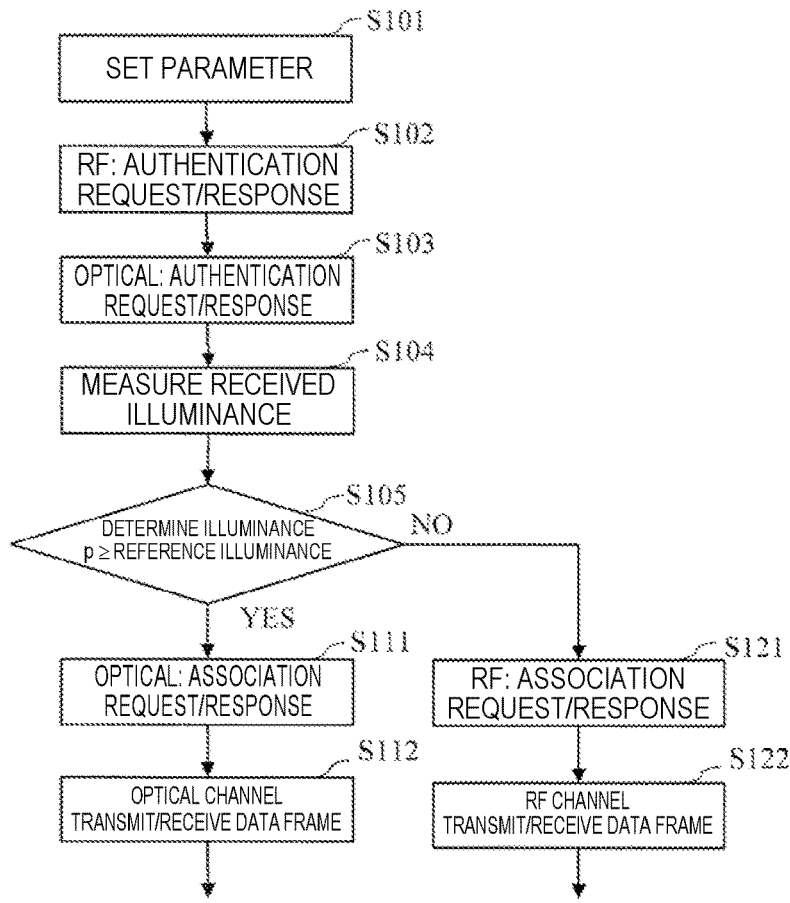
FIG. 8 illustrates an example of an initial connection flow according to a third embodiment.
Figure 9:
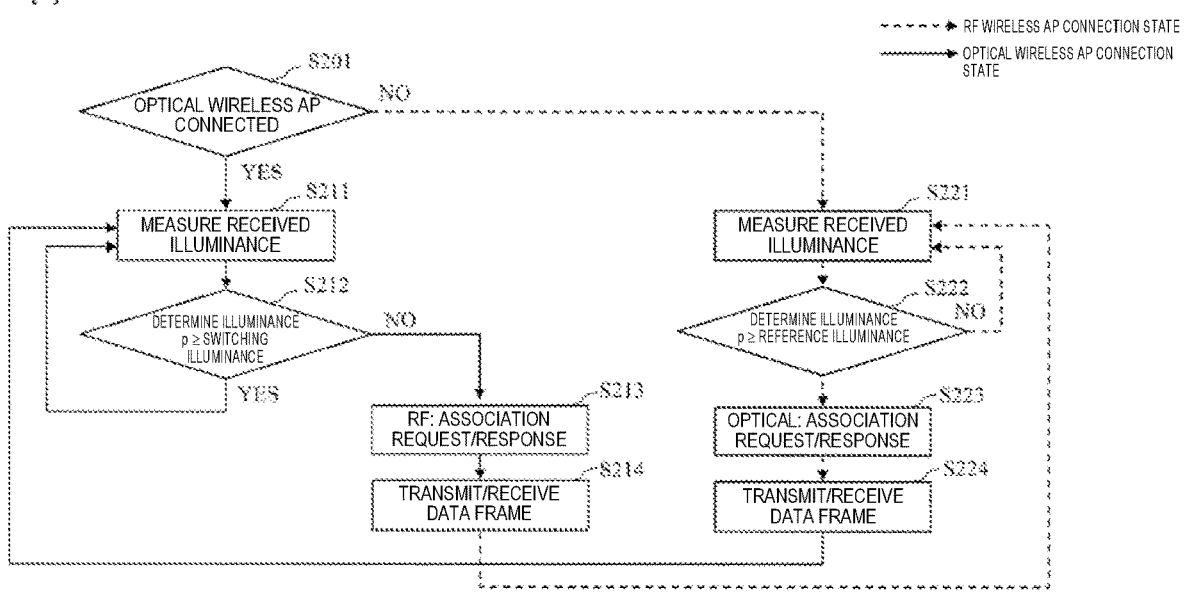
FIG. 9 illustrates an example of a channel switching flow according to the third embodiment.

In FIGS. 8 and 9, a flow from initial connection to channel switching in the system of the present embodiment is illustrated by the flowcharts. FIG. 8 illustrates an initial connection flow. First, the terminal 91 used by a user uses a dedicated application or the like to acquire connection information to the optical wireless AP 92 having been grasped in advance. Connection information to the optical wireless AP 92 includes, for example, illuminance information indicating directivity or the like of the light source of the optical wireless AP 92, moving velocity information of the user at the installation location of the optical wireless AP, installation information of the optical wireless AP, or the like. The terminal 91 acquires such connection information to the optical wireless AP 92, and based on it, automatically sets a parameter (S101).

Then, the RF wireless communication unit 13 performs Authentication process on the RF wireless AP 93 (S102). Further, the optical wireless communication unit 12 performs Authentication process on the optical wireless AP 92 (S103), whereby, Authentication process is performed on the both. Note that regarding the order of performing Authentication process, the optical wireless communication unit 12 may be the first, or the process may be performed simultaneously on the optical wireless communication unit 12 and the RF wireless communication unit 13. Thereafter, the switching control unit 15 performs measurement of the received illuminance (S104).

The switching control unit 15 establishes connection to either the optical wireless AP 92 or the RF wireless AP 93, on the basis of the measured received illuminance p (S105). For example, the switching control unit 15 allows the optical wireless communication unit 12 to connect to the optical wireless AP 92 when the received illuminance is equal to or higher than the reference illuminance, while allows the RF wireless communication unit 13 to connect to the RF wireless AP 93 when the received illuminance is equal to or lower than the reference illuminance. In the case where p≥reference illuminance, the optical wireless communication unit 12 performs Association process with the optical wireless AP 92 (S111), and then performs transmission and reception of a data frame (S112). On the other hand, in the case where p<reference illuminance, the RF wireless communication unit 13 performs Association process with the RF wireless AP 93 (S121), and then performs transmission and reception of a data frame (S122).

FIG. 9 illustrates a channel switching flow. First, the switching control unit 15 determines with which of the optical wireless AP 92 and the RF wireless AP 93 connection is established (S201). When connection is established with the optical wireless AP 92 (S201: Yes), the switching control unit 15 measures the received illuminance (S211), and determines whether or not the monitored received illuminance p is equal to or higher than the switching illuminance $p_{th}$ (S212). When the monitored received illuminance p is equal to or higher than the switching illuminance $p_{th}$ (S212: Yes), the switching control unit 15 measures the received illuminance (S211). On the other hand, when the monitored received illuminance p is lower than the switching illuminance $p_{th}$ (S212: No), the switching control unit 15 immediately performs channel switching to the RF wireless transmission. After performing request/response regarding Association of the RF wireless transmission (S213), the RF wireless communication unit 13 transmits a data frame (S214). Once connection with the RF wireless AP 93 is established, the processing proceeds to the flow of measurement of the received illuminance (S221), and the switching control unit 15 performs measurement of the received illuminance (221) and illuminance determination (S222).

Next, description will be given on a channel switching flow in the case where, as a result of determining connection with the optical wireless AP 92 and the RF wireless AP 93 (S201), connection with the RF wireless transmission is confirmed. Even in the case where connection is established the RF wireless transmission, the switching control unit 15 regularly performs measurement of the received illuminance (S221). When the measured received illuminance is lower than the reference illuminance (S222: NO), the switching control unit 15 performs determination of the received illuminance while maintaining the connection with the RF wireless transmission (S221). On the other hand, when the measured received illuminance is equal to or higher than the reference illuminance (S222: YES), in order to connect to the optical wireless channel, the optical wireless communication unit 12 performs request/response regarding Association with the optical wireless AP 92 (S223), and then performs transmission of a data frame (S224). Once connection with the optical wireless AP 92 is established (S211), the processing proceeds to the flow of measurement of received illuminance (S221), and the switching control unit 15 performs measurement of the received illuminance (S211) and illuminance determination (S212).

Channel switching is performed according to the channel switching flow as described above.

(Another Mode of System Configuration)

Figure 10:
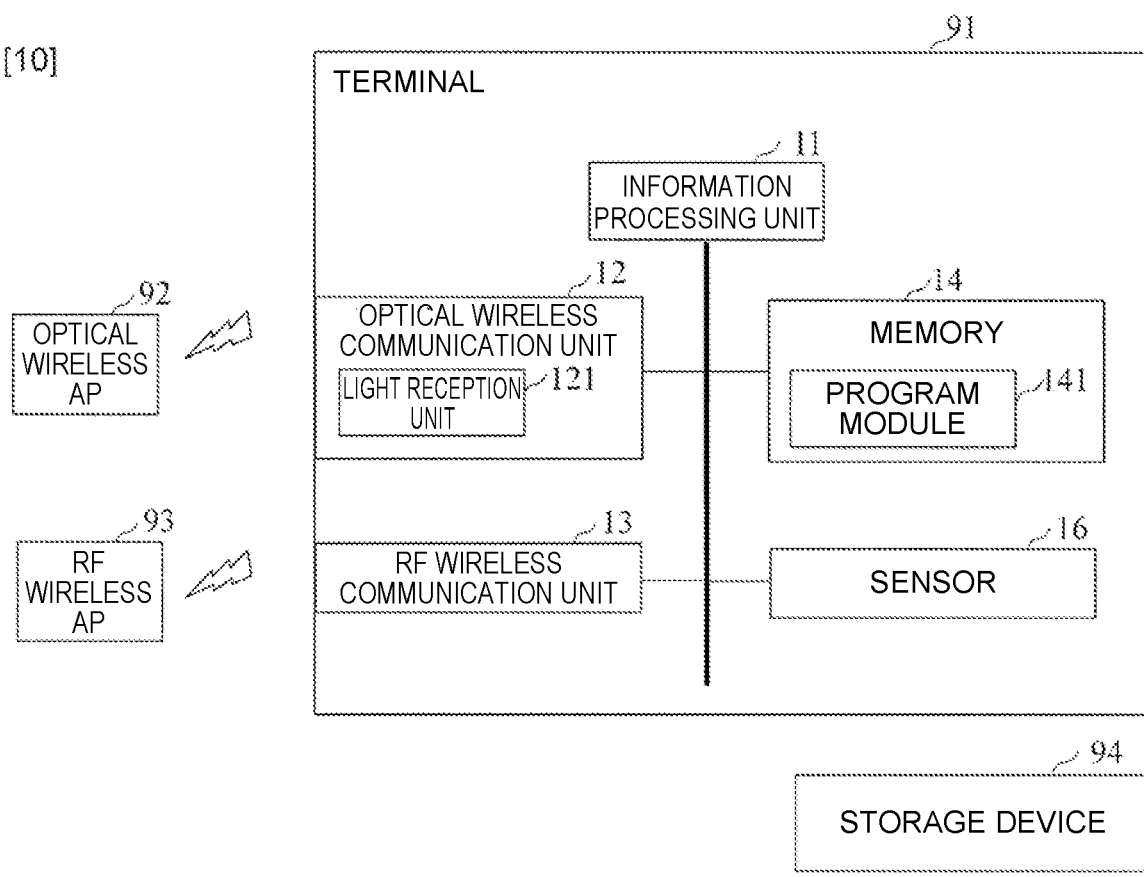
FIG. 10 is another example of a system configuration according to the present disclosure.

FIG. 10 illustrates another example of a system configuration according to the present disclosure. In the terminal 91 illustrated in FIG. 10, a program module for allowing the information processing unit 11 to function as the switching control unit 15 illustrated in FIG. 1 is stored in the memory 14. As described above, the present disclosure can be realized by a computer and a program, and the program can be recorded on the storage device 94 or provided over a network.

INDUSTRIAL APPLICABILITY

The present disclosure is applicable to the information and communication industry.

REFERENCE SIGNS LIST

11 Information processing unit
12 Optical wireless communication unit

121 Light reception unit
13 RF wireless communication unit
14 Memory
141 Program module
15 Switching control unit
16 Sensor
91 Terminal
92 Optical wireless access point
93 RF wireless access point
94 Storage device

The invention claimed is:

1. A wireless communication system comprising:
an optical wireless access point;
a radio frequency (RF) wireless access point; and
a terminal device having a switching control unit that performs a communication process with the optical wireless access point and the RF wireless access point, wherein
assuming that illuminance of an optical signal for performing communication at a throughput set for communication with the optical wireless access point is requested illuminance, the switching control unit sets switching illuminance for maintaining illuminance of an optical signal received by the terminal device at the requested illuminance or higher during a time until connection switching between communication with the optical wireless access point and communication with the RF wireless access point is completed, measures received illuminance of an optical signal transmitted from the optical wireless access point during connection with the optical wireless access point, and compares measured received illuminance with the switching illuminance, and
when the received illuminance becomes lower than the switching illuminance during the connection with the optical wireless access point, the switching control unit performs connection switching from the communication with the optical wireless access point to the communication with the RF wireless access point.

2. The wireless communication system according to claim 1, wherein
the switching control unit
sets reference illuminance for received illuminance higher than the switching illuminance,
measures the received illuminance of the optical signal transmitted from the optical wireless access point during connection with the RF wireless access point, and compares the measured received illuminance with the reference illuminance, and
when the received illuminance becomes equal to or higher than the reference illuminance during the connection with the RF wireless access point, performs connection switching from the communication with the RF wireless access point to the communication with the optical wireless access point.

3. The wireless communication system according to claim 1, wherein
the switching control unit
acquires a distance between the terminal device and the optical wireless access point, and a moving velocity of the terminal device, and
sets the switching illuminance using the distance and the moving velocity acquired.

4. The wireless communication system according to claim 3, wherein the switching control unit derives the switching illuminance using a following expression:

[Math. C1]

$$p_{th} = \Delta t \left| -\frac{nv}{L}\cos^{n+1}\alpha \sin\alpha \right|_{maximized} + p_{req} \quad (C1)$$

where $\alpha = \tan^{-1} vt/L$, $0 \leq \alpha \leq \pi/2$ $p_{th}$: switching illuminance
$\Delta t$: channel switching time
n: predetermined coefficient
v: moving velocity of terminal device
L: distance between terminal device and optical wireless access point
$p_{req}$: requested illuminance.

5. The wireless communication system according to claim 4, wherein
the channel switching time is a time calculated by eliminating a time required for an authentication process at the RF wireless access point from a time required for channel switching from the optical wireless access point to the RF wireless access point, or a time calculated by eliminating a time required for an authentication process at the optical wireless access point from a time required for channel switching from the RF wireless access point to the optical wireless access point.

6. A terminal device comprising:
an optical wireless communication unit that performs communication with an optical wireless access point, and an RF wireless communication unit that performs communication with a radio frequency (RF) wireless access point; and
a switching control unit that,
assuming that illuminance of an optical signal for performing communication at a throughput set for the communication with the optical wireless access point is requested illuminance, sets switching illuminance for maintaining illuminance of an optical signal received by the terminal device at the requested illuminance or higher during a time until connection switching between communication with the optical wireless access point and communication with the RF wireless access point is completed,
measures received illuminance of an optical signal transmitted from the optical wireless access point during connection with the optical wireless access point, and compares measured received illuminance with the switching illuminance, and
when the received illuminance becomes lower than the switching illuminance during the connection with the optical wireless access point, performs connection switching from the communication with the optical wireless access point to the communication with the RF wireless access point.

7. A wireless communication method comprising:
by a switching control unit provided to a terminal device, assuming that illuminance of an optical signal for performing communication at a throughput set for communication with the optical wireless access point is requested illuminance, setting switching illuminance for maintaining illuminance of an optical signal received by the terminal device at the requested illuminance or higher during a time until connection switching between communication with the optical wireless access point and communication with the radio frequency (RF) wireless access point is completed;

measuring received illuminance of an optical signal transmitted from the optical wireless access point during connection with the optical wireless access point, and comparing measured received illuminance with the switching illuminance; and when the received illuminance becomes lower than the switching illuminance during the connection with the optical wireless access point, performing connection switching from the communication with the optical wireless access point to the communication with the RF wireless access point.

8. The wireless communication method according to claim 7, further comprising:

by the optical wireless communication unit, performing an authentication process with the optical wireless access point, and by the RF wireless communication unit, performing an authentication process with the RF wireless access point; and after a connection process by the optical wireless communication unit and the RF wireless communication unit, by the switching control unit, comparing the received illuminance with the switching illuminance.

* * * * *